Nov. 3, 1964 L. O. VLADIMIR 3,155,970
MICROWAVE RECEIVER-TRANSMITTER
Filed Nov. 15, 1957
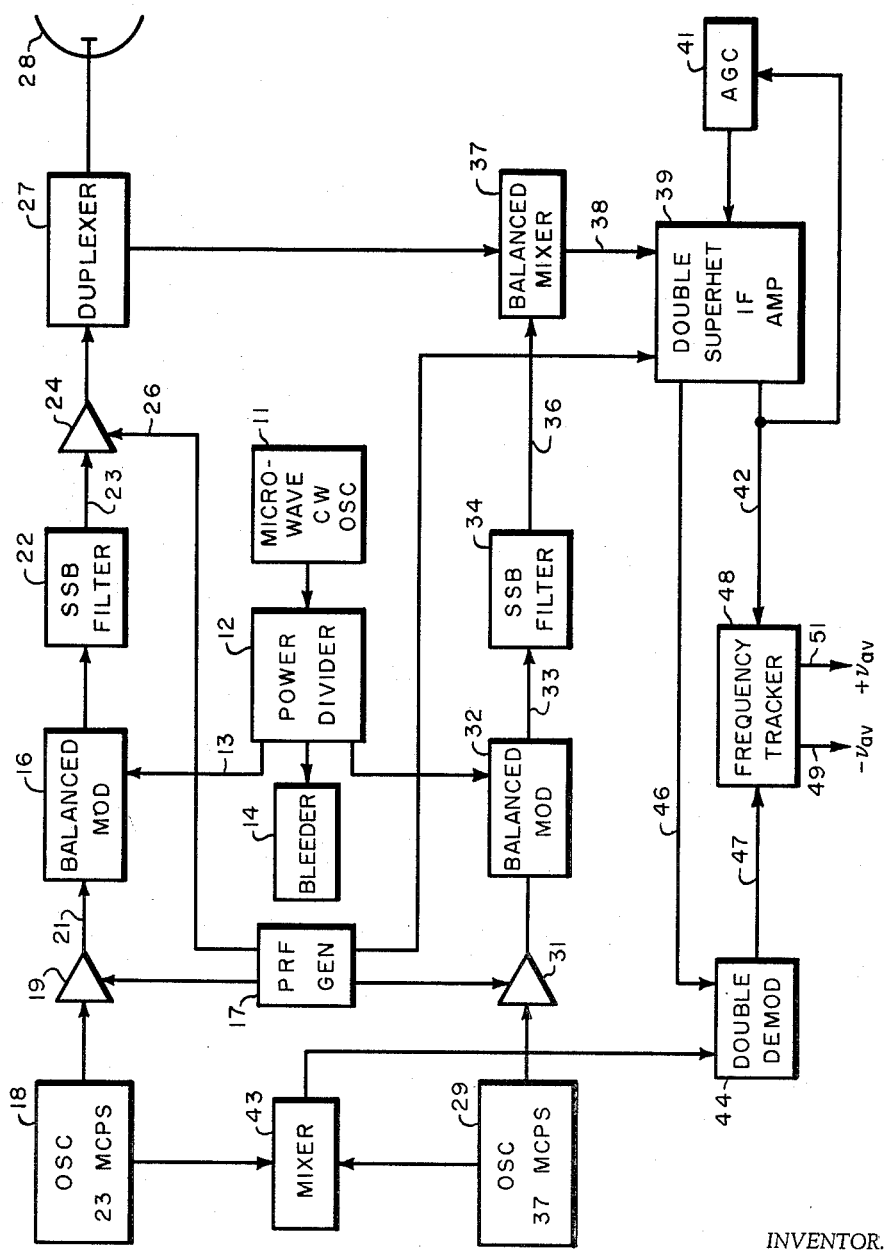
INVENTOR.
LEONARD O. VLADIMIR
BY
ATTORNEY.

United States Patent Office 3,155,970
Patented Nov. 3, 1964

3,155,970
MICROWAVE RECEIVER-TRANSMITTER
Leonard O. Vladimir, Chappaqua, N.Y., assignor to General Precision Inc., a corporation of Delaware
Filed Nov. 15, 1957, Ser. No. 696,872
8 Claims. (Cl. 343—8)

This invention relates to microwave radio instruments employing echo signals to secure Doppler information, and more specifically to the transmitters and receivers of such instruments.

When Doppler information is utilized to provide aircraft navigation, several microwave rays are beamed from the aircraft toward the earth at an angle, and the Doppler information is derived from the reflected echo signals. From this information can be secured signals representing aircraft ground speed, drift angle and vertical velocity.

In such instruments it may be preferable to transmit the microwave energy in pulses. When pulse signals are employed, however, it is desirable that successive pulses be coherent, that is, are referred to a common phase standard. This is particularly desirable at long ranges and at high altitudes. In order to derive vertical velocity information, it is necessary to demodulate the echo signals of the several beams separately and coherently. This method of operation is in distinction to the Janus or self-coherent method in which two echo signals, one from a forward beam and one from a rear beam, are mixed and beat together to secure the sum of the contained Doppler frequencies by self-heterodyne demodulation. In conventional coherent demodulation, on the other hand, the echo signal is beat with a small fraction of energy secured directly from the microwave transmitter. This, however, gives rise to an energy storage problem if the transmitter is pulsed.

In the present invention the transmitting oscillator is a continuous wave (CW) generator, and operates continuously. Use is made of microwave amplifiers to amplify the transmitting energy. These amplifiers are gated or pulsed so that their output radiated in beams from the antenna consist of pulses of microwave energy.

A straightforward design of pulsed CW oscillator transmitting circuit would require an isolation of some 100 db between the oscillator circuits and the receiving circuits. In order to eliminate this requirement, two frequency conversions of offsets are employed. The CW oscillator output is frequency-converted, by modulation with a first relatively low frenquency energy and selection of one sideband, to a microwave frequency offset or removed by a few megacycles from the oscillator frequency. This new frequency is then pulsed, amplified, and radiated from the antenna. Successive pulses are therefore phase coherent.

The CW oscillator output is again frequency-converted, by modulation with a second relatively low frequency energy and selection of one sideband, to a second offset microwave frequency removed by several megacycles from the oscillator frequency. This circuit is termed a "pseudo local oscillator" and its output is used to frequency-convert the received echo signal frequency to an intermediate carrier frequency. The pseudo local oscillator output is highly stable and is phase-coherent with the CW oscillator output.

The intermediate frequency (IF) amplifier may be a double demodulation superheterodyne. Its first stage generates an exceptionally low level of electrical noise, improving the overall signal-to-noise (S/N) ratio. Several stages are gated to disable the receiver during each transmitting pulse. The IF amplifier employs two sets of amplifying stages of different frequencies. A high IF frequency is selected for the first stages to secure the broad frequency transmission ability necessary for high speed gating. Later stages amplify at 9 m.c.p.s. to secure the required output signal level and to eliminate all received sidebands above the zero order sideband. Automatic gain control is employed at both IF frequencies. Output of the IF amplifier at its single Doppler signal output terminal is at two frequencies, unseparated and in the same circuit, as required by the following frequency tracker with which the receiver-transmitter is designed to operate. One frequency is a base frequency plus the Doppler frequency derived from forward antenna beams. The other frequency is the same base frequency minus the Doppler frequency derived from rear antenna beams.

A second receiver-transmitter output consist of the base frequency alone and is required for demodulation within the frequency tracker. The frequency tracker output consists of the two above mentioned Doppler frequencies, designated for convenience as $+v$ and $-v$ to indicate origins in forward and after beam echoes, respectively.

A peculiarity of Doppler microwave instruments is the cylical variation of both strength of signal and of Doppler frequency with distance to the target, which in the present invention is proportional to altitude. This is commonly termed the "altitude hole" effect. In order to reduce these variations, particularly at high altitudes, the present invention employs a high rate of pulse repetition. For the same reason, and particularly to lessen the effect at all altitudes, the pulse repetition frequency is modulated or varied in frequency. A particularly important result is the improvement in constancy at all altitudes of the calibration constant or radio between the observed Doppler frequency and the actual aircraft ground speed.

In the operation of the instant system, pulsed signals are transmitted to the earth and received after an interval which is the microwave travel time from the aircraft to earth and back to the aircraft. The received pulsed echo signals are, in effect, again interrupted or pulsed by the receiver gating, so that they are doubly cyclically pulsed, first in the transmitter and again in the receiver. The signal is also modified by the altitude hole effect as stated. Although the received signal includes sidebands extending from the carrier frequency at pulse repetition frequency intervals, it is expedient to utilize only the zeroeth sideband adjacent to the carrier frequency.

Based on the above facts it has been found that a transmitting pulse duration equal to the receiver "on" time gives the best results for several reasons, one of which is that it provides maximum signal energy in the zeroeth sideband. This corresponds roughly to a 1:2 transmission duty ratio.

The purpose of the invention is to provide an improved arrangement for isolating the transmitted signal from the receiver of a receiver-transmitter utilizing a continuous wave oscillator as an instrumentality for producing pulsed transmitted microwave energy and as a heterodyne signal source for received echo signals.

A further understanding of the invention may be secured by reference to the following detailed description and the associated drawings, in which the single figure is a functional block diagram of the receiver-transmitter of the invention.

Referring now to the drawing, a continuous wave oscillator 11 generates microwave energy at a frequency of 10,000 megacycles per second. This oscillator operates continuously and its frequency is preferably stabilized by, for example, use of a high-Q resonant cavity. Its power output need be only a few watts. Output is applied to a power divider 12 which, for example, is a directional coupler with a small fraction of the total input power transmitted to output arm 13. The remainder may be absorbed in a dissipative load 14 which serves as a bleeder, maintaining the oscillator load relatively constant in spite of useful load variations due to pulsing. Output energy at the arm 13 is of the order of 100 milliwatts and is applied to one input of a balanced modulator 16.

A pulse repetition frequency (PRF) generator 17 emits a substantially square wave at a median frequency of 500,000 cycles per second. This generator may consist of a sine wave generator followed by clipping circuits to convert the sinusoidal waveform to a trapezoidal waveform approximating a square wave. This trapezoidal wave form may have, for example, 0.8 $\mu$s. flat tops and rise and fall times of 0.1 $\mu$s. each. The median frequency of 500 kc.p.s. is varied or frequency modulated with an excursion of ±20% at a rate of 150 c.p.s. The frequency modulation waveform may be triangular which is easy to generate and is reasonably efficient in mitigating the altitude hole effect. The output of the PRF generator is applied at several points in the receiver-transmitter to gate or control the outputs of various components thereof. Because of this the PRF generator may also be termed a gate generator.

A highly stable oscillator 18, preferably crystal controlled, emits sinusoidal oscillations at a frequency of 23 mc.p.s. Its output is applied to a gated amplifier 19. Amplifier gating is effected by application of the output of the PRF generator 17, so that the amplifier is alternately conductive and nonconductive and its output at conductor 21 consists of pulses of 23 mc.p.s. energy.

These pulses are applied to balanced modulator 16 which emits the upper and lower sideband modulation products. These sideband signals are applied to a single sideband microwave filter 22 which transmits the lower sideband and suppresses the upper sideband. The output microwave energy at conductor 23 thus has a frequency of 9977 mc.p.s. This is the transmitter signal frequency. The signal is amplified in microwave amplifier 24 which is pulsed or gated by PRF pulses received from PRF generator 17 through conductor 26. This second gating, which is in synchronism with the gating of amplifier 19, is utilized to secure sufficient isolation of the antenna from the transmitting energy during the "off" periods. The pulsed output of amplifier 24 is transmitted through a microwave duplexer 27 to a microwave antenna 28, which radiates the signal in narrow beams.

A second stable oscillator 29, preferably crystal controlled, emits a continuous signal at a frequency of 37 mc.p.s. This signal is amplified in gated amplifier 31, gating being effected by the PRF generator 17. However, this receiving gate is of opposite phase to the transmitting gates applied to amplifiers 19 and 24. The gated output is applied to a balanced modulator 32 to which is also applied a small amount of the output energy of microwave CW generator 11 through the attenuating power divider 12. The output of balanced modulator 32 on conductor 33, consisting of the upper and lower sideband modulation products, is filtered in single sideband filter 34 which transmits only the upper sideband and suppresses the lower sideband. The output on conductor 36 therefore has a frequency of 10,037 mc.p.s. This is termed the pseudo local oscillator frequency, since this signal has the same function as the output signal of the separate local oscillator found in certain conventional microwave devices.

Beam echoes received from the target, in this example the earth, are picked up by the antenna 28 and are transmitted through duplexer 27 to a microwave mixer and balanced demodulator 37. Here the echo signals are mixed with and heterodyned by the pseudo local oscillator signal, producing sum and difference sideband signals. The difference signal has a frequency of 60 mc.p.s., the first IF frequency, and is transmitted through conductor 38 to a double-demodulation superheterodyne receiver 39. This receiver amplifies first at 60 mc.p.s. and second at 9 mc.p.s., followed by a demodulator which beats the signal to a base frequency of 140 kc.p.s. Several of the first stages of the receiver 39 are gated by pulses from generator 17, these gates being utilized in addition to the amplifier 31 gating to effect sufficient isolation of the receiver from the transmitted energy during transmitting pulses. These gating pulses are in phase with the pulses due to gating of amplifier 31. The receiver 39 is provided with an automatic gain control (AGC) circuit 41, which utilizes a signal derived from the output conductor 42 of the receiver to adjust the gain at selected time rates and in synchronism with the antenna beaming rate of the 60 mc.p.s. and 9 mc.p.s. stages of the receiver.

The oscillators 18 and 29 have been described as having output frequencies of 23 and 37 mc.p.s., the sum being 60 mc.p.s. However, these oscillators may have any frequencies whatever providing that their sum constitutes a suitable selected intermediate frequency, that neither one is so small as to prevent filtering of the demodulation products from the carrier, and that they have no harmonics which coincide with any other frequencies or harmonics thereof employed in the receiver-transmitter.

A requirement of the frequency tracker following the receiver-transmitter is that it coherently demodulates the 140 kc.p.s. Doppler signal supplied from the receiver-transmitter and derives Doppler information therefrom. To do this the frequency tracker must be supplied with a 140 kc.p.s. base signal which is phase coherent with the transmitter output. Such a signal is generated by mixing and heterodyning the outputs of the 23 mc.p.s. oscillator 18 and the 37 mc.p.s. oscillator 29 in a mixer 43, deriving the sum and difference modulation frequencies of 14 and 60 mc.p.s. These outputs are filtered and double demodulated in demodulator 44, the 14 mc.p.s. sideband being eliminated and the 60 mc.p.s. sideband being transformed to a frequency of 140 kc.p.s. In order to preserve coherence the heterodyning oscillator signals employed in the demodulator 44 are those produced by the oscillator of the superheterodyne receiver 39, these oscillator signals being applied to the double demodulator 44 over the circuit 46.

The 140 kc.p.s. base frequency output of double demodulator 44 is applied through conductor 47 to a frequency tracker 48, as is the output in conductor 42 from the superheterodyne receiver 39. The latter output consists of two separate frequency spectra, the first having the frequency spectrum of the base frequency plus the Doppler frequency spectrum, or $140{,}000 + \nu$ cycles per second, and the second having the base frequency minus the Doppler spectrum, or $140{,}000 - \nu$ c.p.s. The frequency tracker tracks changes in both $+\nu$ and $-\nu$, finds the mean or center frequency of each, averages each in time, and emits two outputs at terminals 49 and 51 as signals $-\nu_{av}$ and $\nu_{av}$ which represent the two means, average Doppler spectra. Such a frequency tracker including conventional demodulation components may be, for example, of the kind described in patent application Serial No. 314,306, filed October 11, 1952, now Patent No. 2,856,519, issued October 14, 1958.

To recapitulate the operation of this invention, an aircraft transmitting signal is derived from a continuously running oscillator 11 having a frequency $f_0$ by heterodyning and filtering to a frequency $f_0 - 23$ mc. This signal is beamed through fore and aft beams to the earth and the echoes are received. The fore beam echoes have the frequency $f_0 - 23$ mc. $+ \nu_1$ and the rear beam echoes have the frequency $f - 23$ mc. $- \nu_2$. In level flight and assuming equal beam angles, $\nu_1 = \nu_2$. A pseudo local oscillator signal is produced by beating the oscillator output with the output of an oscillator having the frequency of 37 mc.p.s. and filtering to secure the sum frequency of $f_0 + 37$. In the receiver the echo signals are mixed and beat with the pseudo local oscillator signal to form signals $\pm(f_0-23+\nu_1)+(f_0+37)$ and $\pm(f_0-23-\nu_2)+(f_0+37)$. These signals are applied to the IF 60 mc.p.s. input, which rejects the sum sidebands having microwave frequencies of about 20,000 mc.p.s. The difference sidebands are 60 mc.$-\nu_1$ and 60 mc.$+\nu_2$. With each are a series of Fourier sidebands having the frequencies 60 mc.$\pm nf_p-\nu$ and 60 mc.$\pm nf_p+\nu$ in which $n$ is any integer and $f_p$ is the pulse repetition frequency. The IF 60 mc. amplifier is broadband enough to transmit a number of these Fourier sideband. However, because a 1:2 duty cycle is used, as before mentioned, most of the energy is in the zeroeth sidebands, described by the above terms when $n$ is placed equal to zero. Accordingly the 9 mc.p.s. amplifier section of the IF amplifier is made narrow band enough to exclude all but the zeroeth sidebands having the frequencies 9 mc.$\pm\nu$. These sidebands are heterodyned by an oscillator having 8.86 mc.p.s. frequency to 140 kc.p.s.$\pm\nu$, which are transmitted as the output signals of the receiver-transmitter through conductor 42 to the frequency tracker 48. There they are operated on as described to form $-\nu_{av}$ and $+\nu_{av}$.

What is claimed is:

1. A microwave receiver-transmitter comprising, a first continuous wave oscillator, a second continuous wave oscillator, a first modulator having the output of said first and second oscillators impressed thereon and producing a first modulated signal therefrom, a single sideband filter having said first modulated signal impressed thereon and transmitting only the lower sideband signal thereof, gating means connected to the output of said single sideband filter for converting the output thereof into a succession of pulse signals, radiating means transmitting said pulse signals and receiving the reflected echo signals thereof, a third continuous wave oscillator, a second modulator having the outputs of said first and third oscillators impressed thereon and producing a second modulation signal therefrom, a single side band filter having said second modulated signal impresed thereon and transmitting only the upper sideband signal thereof, a mixer having the reflected echo signals and the upper sideband of said second modulated signal impressed thereon producing an intermediate frequency signal therefrom, and means for deriving Doppler information from said intermediate frequency signal.

2. A microwave receiver-transmitter comprising, a first continuous wave oscillator, a second continuous wave oscillator, a first modulator having the output of said first and second oscillators impressed thereon and producing a first modulated signal therefrom, a single sideband filter having said first modulated signal impressed thereon and transmitting only the lower sideband signal thereof, gating means connected to the output of said single sideband filter for converting the output thereof into a succession of pulse signals, radiating means transmitting said pulse signals and receiving the reflected echo signals thereof, a third continuous wave oscillator, a second modulator having the outputs of said first and third oscillators impressed thereon and producing a second modulation signal therefrom, a single sideband filter having said second modulated signal impressed thereon and transmitting only the upper sideband signal thereof, a mixer having the reflected echo signals and the upper sideband of said second modulated signal impressed thereon producing an intermediate frequency signal therefrom, a mixer having the outputs of said second and third oscillators impressed thereon and producing therefrom a sum signal whose frequency is substantially equal to the frequency of said intermediate frequency signal, common oscillator means for reducing said sum signal and said intermediate frequency signal to signals having a lower frequency, and means for obtaining Doppler information from said last mentioned signals.

3. A microwave receiver-transmitter comprising, a first continuous wave oscillator, a second continuous wave oscillator, a first modulator having the output of said first oscillator impressed thereon, gating means interconnecting the output of said second oscillator and the input of said first modulator for cyclically interrupting the flow of energy therebetween whereby the output of said first modulator comprises a succession of pulse signals, a single sideband filter connected to the output of said first modulator transmitting only the lower sideband signal thereof, radiating means for transmitting signal energy and receiving reflected echo signals thereof, gating means interconnecting the output of said single sideband filter and said radiating means and operated in time relation to said first gating means to insure transmission of successive pulse signals of said sideband frequency, a third continuous wave oscillator, a second modulator having the outputs of said first and third oscillators impressed thereon and producing a second modulated signal therefrom, a single sideband filter having said second modulated signal impressed thereon and transmitting only the upper sideband signal thereof, a mixer having the reflected echo signals and the upper sideband of said second modulated signal impressed thereon producing an intermediate frequency signal therefrom, and means for deriving Doppler information from said intermediate frequency signal.

4. A microwave receiver-transmitter comprising, a first continuous wave oscillator, a second continuous wave oscillator, a first modulator having the output of said first oscillator impressed thereon, gating means interconnecting the output of said second oscillator and the input of said first modulator for cyclically interrupting the flow of energy therebetween whereby the output of said first modulator comprises a succession of pulse signals, a single sideband filter connected to the output of said first modulator transmitting only the lower sideband signal thereof, radiating means for transmitting signal energy and receiving reflected echo signals thereof, gating means interconnecting the output of said single sideband filter and said radiating means and operated in timed relation to said first gating means to insure transmission of successive pulse signals of said sideband frequency, a third continuous wave oscillator, a second modulator having the outputs of said first and third oscillators impressed thereon and producing a second modulated signal therefrom, a single sideband filter having said second modulated signal impressed thereon and transmitting only the upper sideband signal thereof, a mixer having the reflected echo signals and the upper sideband of said second modulated signal impressed thereon producing an intermediate frequency signal therefrom, a mixer having the outputs of said second and third oscillators impressed thereon and producing therefrom a sum signal whose frequency is substantially equal to the frequency of said intermediate frequency signal, common oscillator means for reducing said sum signal and said intermediate frequency signal to signals having a lower frequency, and means for obtaining Doppler information from said last mentioned signals.

5. A microwave receiver-transmitter comprising, a first continuous wave oscillator, a second continuous wave oscillator, a first modulator having the output of said first oscillator impressed thereon, gating means interconnecting the output of said second oscillator and the input of said first modulator for cyclically interrupting the flow of energy therebetween whereby the output of said first modulator comprises a succession of pulse signals, a single sideband filter connected to the output of said first modulator transmitting only the lower sideband signal thereof, radiating means for transmitting signal energy and receiving reflected echo signals thereof, gating means interposed between the output of said single sideband filter and said radiating means and operated in timed relation to said first mentioned gating means to insure transmission of pulse signals at said sideband frequency, a third continuous wave oscillator, a second modulator having the output of said oscillator impressed thereon, gating means interconnecting the output of said third oscillator and the input of said second modulator operated to transmit signals only during those periods during which the radiation of pulse signals is inhibited whereby the output of said second modulator comprises a succession of pulse signals occurring during the intervals between said first mentioned pulse signals, a sideband filter having the output of said second modulator impressed thereon and transmitting only the upper sideband thereof, a mixer having the reflected echo signals and said upper sideband signal impressed thereon and producing an intermediate frequency signal therefrom, and means for deriving Doppler information from said intermediate frequency signal.

6. A microwave receiver-transmitter comprising, a first continuous wave oscillator, a second continuous wave oscillator, a first modulator having the output of said first oscillator impressed thereon, gating means interconnecting the output of said second oscillator and the input of said first modulator for cyclically interrupting the flow of energy therebetween whereby the output of said first modulator comprises a succession of pulse signals, a single sideband filter connected to the output of said first modulator transmitting only the lower sideband signal thereof, radiating means for transmitting signal energy and receiving reflected echo signals thereof, gating means interposed between the output of said single sideband filter and said radiating means and operated in timed relation to said first mentioned gating means to insure transmission of pulse signals at said sideband frequency, a third continuous wave oscillator, a second modulator having the output of said oscillator impressed thereon, gating means interconnecting the output of said third oscillator and the input of said second modulator operated to transmit signals only during those periods during which the radiation of pulse signals is inhibited whereby the output of said second modulator comprises a succession of pulse signals occurring during the intervals between said first mentioned pulse signals, a sideband filter having the output of said second modulator impressed thereon and transmitting only the upper sideband thereof, a mixer having the reflected echo signals and said upper sideband signal impressed thereon and producing an intermediate frequency signal therefrom, a mixer having the outputs of said second and third oscillators impressed thereon and producing therefrom a sum signal whose frequency is substantially equal to the frequency of said intermediate frequency signal, common oscillator means for reducing said sum signal and said intermediate frequency signal to signals having a lower frequency, and means for obtaining Doppler information from said last mentioned signals.

7. A microwave receiver-transmitter comprising, a first continuous wave oscillator, a second continuous wave oscillator, a first modulator having the outputs of said first and second oscillators impressed thereon and producing a first modulated signal therefrom, means for suppressing all but a single sideband of said first modulated signal, gating means converting said single sideband into a succession of pulse signals, radiating means transmitting said pulse signals and receiving the reflected echo signals thereof, a third continuous wave oscillator, a second modulator having the outputs of said first and third oscillators impressed thereon and producing a second modulated signal therefrom, means for suppressing all but a single sideband of said second modulated signal, a mixer having the reflected echo signals and the unsuppressed sideband of said second modulated signal impressed thereon producing an intermediate frequency signal therefrom, and means for deriving Doppler information from said intermediate frequency signal.

8. A microwave receiver-transmitter comprising, a first continuous wave oscillator, a second continuous wave oscillator, a first modulator having the outputs of said first and second oscillators impressed thereon and producing a first modulated signal therefrom, means for suppressing all but a single sideband of said first modulated signal, gating means converting said single sideband into a succession of pulse signals, radiating means transmitting said pulse signals and receiving the reflected echo signals thereof, a third continuous wave oscillator, a second modulator having the outputs of said first and third oscillators impressed thereon and producing a second modulated signal therefrom, means for suppressing all but that sideband of said second modulated signal which is displaced in frequency from the output frequency of said first oscillator in a direction opposite to the frequency displacement of the unsuppressed sideband of said first modulated signal with respect to the output frequency of said first oscillator, a mixer having the reflected echo signals and the unsuppressed sideband of said second modulated signal impressed thereon producing an intermediate frequency signal therefrom, and means for deriving Doppler information from said intermediate frequency signal.

References Cited in the file of this patent

UNITED STATES PATENTS

| | | |
|---|---|---|
| 2,405,765 | Smith | Aug. 13, 1946 |
| 2,586,028 | Grayson | Feb. 19, 1952 |
| 2,883,656 | Russell | Apr. 21, 1959 |